(No Model.)
F. STORAR.
PACKINGLESS VALVE.
No. 493,567. Patented Mar. 14, 1893.
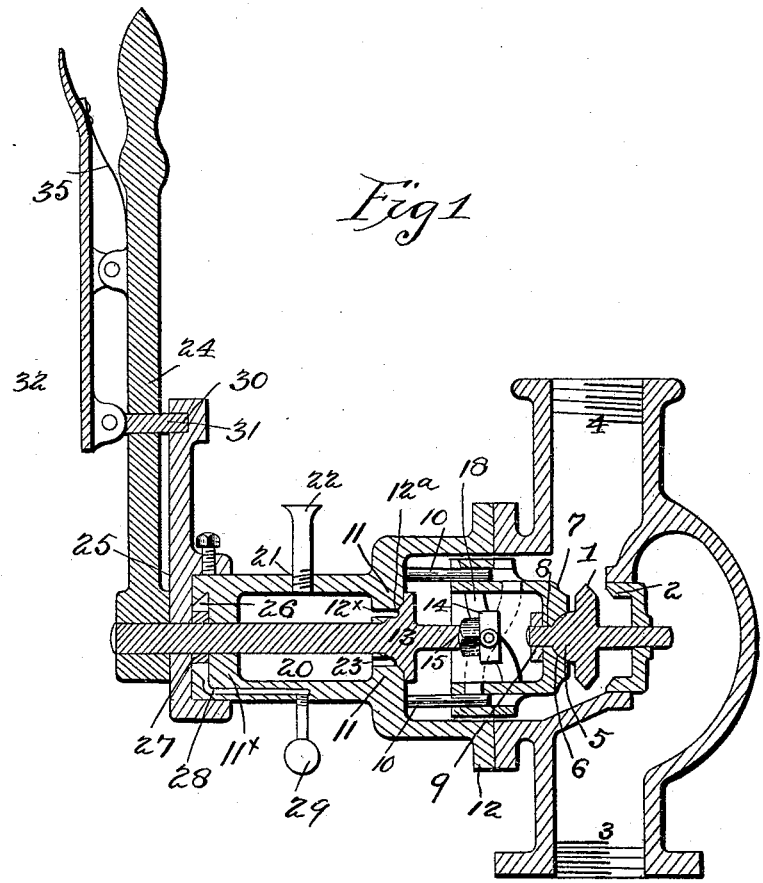
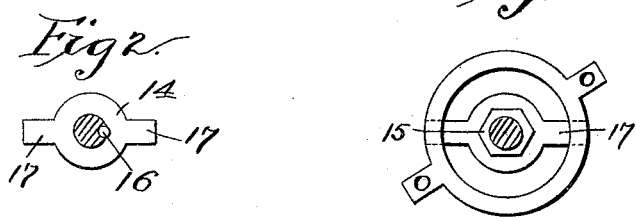
Attest
Wm. T. Hall
James M. Shea
Inventor
Fordyce Storar
by Walter Donaldson & Co.
Atty

UNITED STATES PATENT OFFICE.

FORDYCE STORAR, OF SPRINGFIELD, ILLINOIS.

PACKINGLESS VALVE.

SPECIFICATION forming part of Letters Patent No. 493,567, dated March 14, 1893.

Application filed July 18, 1892. Serial No. 440,356. (No model.)

*To all whom it may concern:*

Be it known that I, FORDYCE STORAR, a citizen of the United States of America, residing at Springfield, in the county of Sangamon and State of Illinois, have invented certain new and useful Improvements in Packingless Valves, of which the following is a specification, reference being had therein to the accompanying drawings.
My invention relates to valves and is designed to render the same quick and easy of operation and obviate the objectionable feature of leakage common in many forms of valves in which packing is used, my valve being without packing of any kind and yet perfectly sealed against the escape of the fluid through the joints.

In the drawings: Figure 1 represents the valve in casing in section and Figs. 2 and 3 are plan views of details.

The valve 1 is arranged to be seated on an ordinary form of seat 2, between the inlet and outlet ports 3 and 4. It is provided with a semi spherical head 5, seated in a corresponding socket 6, in the yoke 7, the said head having a pin or stem 8, passing through the yoke and held by a nut 9. The yoke is permitted to have movement toward and from the valve seat, it being guided preferably by pins or rods 10 projecting from the partition 11, across the section 12, of the casing. This partition has a conical seat or socket $12^x$ on the side nearest the valve which receives the conical collar 13 on the valve stem. The lower end of the valve stem has a thread and carries a cross head 14, which is held firmly in position by the jam nut 15, and a pin 16, driven through an opening between the cross head and the stem. The cross head has projections 17, which enter the grooves 18 in the yoke extending around the same. The grooves have high and low parts and are of such shape and pitch that the cross heads when turned will raise or depress the yoke quickly and unseat or seat the valve, it being understood that the yoke is held from rotary motion by the guide pins. The valve stem passes through the chamber 20 formed by the outer walls of the casing, the partition 11, and the upper partition $11^x$, the latter being very near the end of the casing. This chamber is tapped at its side with an opening 21, into which the pipe 22 is fitted for the introduction of the oil into the chamber. A small port 23 leads from this chamber to the conical seat 12, and a small groove $12^a$ is formed either in this seat or about the surface of the conical collar, the purpose being to receive and hold a portion of the oil and not only to form a seal here but also serve to lubricate the bearing and permit the valve to be turned quickly and easily. The oil in the chamber also forms an effective means for sealing the joints against the escape of steam. The outer or upper end of the stem projects through the partition at the end of the casing and a lever or handle 24 is secured adjustably thereto. A cover 25 is also secured adjustably over the end of the casing, forming between itself and the partition $11^x$, a chamber or pocket 26, in which a collar 27 is arranged and fixed to the stem; said collar together with the conical collar 13, serving to retain the valve stem against longitudinal displacement. From this pocket a passage 28 extends through the wall of the casing and connects with a bulb 29. Any escape of oil or steam through the joints about the valve stem will pass from the pocket into the bulb and at once be visible to the attendant.

The cover 25, as before stated, is adjustable at the end of the casing and it carries a segmental plate having a series of holes 30 adapted to receive the catch pin 31 on the catch lever 32, pivoted to the main lever and under tension of the spring 35. The stop plate and lever may be adjusted to any desired radial position to suit any position it which the valve may be placed.

I claim as my invention—

1. In combination the casing, the valve the oil chamber, the partition between the oil chamber and valve chamber, the valve stem passing through the said partition and oil chamber, the means for preventing inward longitudinal movement of the valve stem, the means for preventing outward movement consisting of the collar on the stem bearing on the partition of the casing, the yoke for holding the valve, having interior grooves and the cross head connection between the yoke and the valve stem, substantially as described.

2. In combination the casing having the partitions forming the oil chamber, the valve, the valve stem passing through said chamber and having a stop collar seated against one of the partitions to hold the stem against longitudinal movement, the said partition having a passage leading to said seat, from the oil chamber, and the connection from the valve for moving the latter to and from its seat as the stem is rotated substantially as described.

3. In combination the casing having an oil chamber, the valve, the valve stem having a collar, the seat within the casing for said collar, the said casing having a passage for the oil leading to said seat, one of the said parts, the seat or collar being grooved, substantially as described.

4. In combination the casing having the sealing oil chamber, the valve, the valve stem passing through the said oil chamber, the end pocket, the passage leading therefrom and the bulb to which said passage extends for catching the escape, substantially as described.

5. In combination the casing, the valve, the valve stem, the lever on the end of the valve stem, the cover plate having a series of perforations, the catch lever on the main lever having a pin adapted to engage the said plate, both the main lever and the said cover plate being adjustable, substantially as described.

In testimony whereof I affix my signature in presence of two witnesses.

FORDYCE STORAR.

Witnesses:
JAMES M. BROWN,
W. J. KING.